C. P. THOMPSON.
STABLE STALL.
No. 177,439.　　　　Patented May 16, 1876.
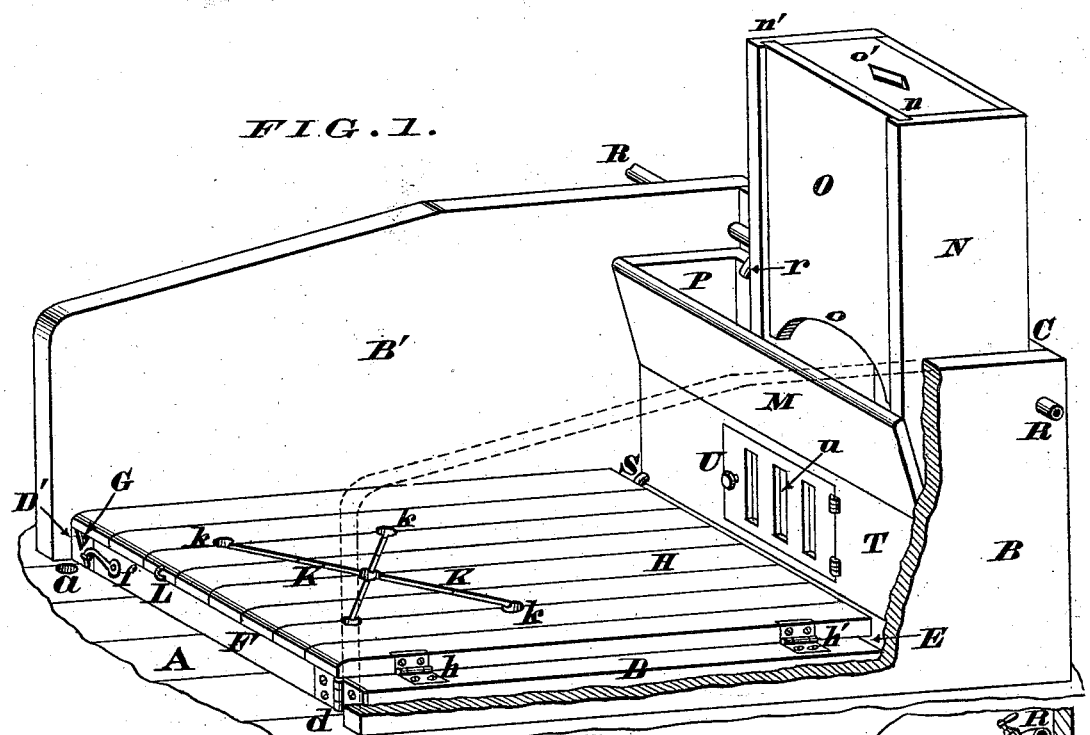
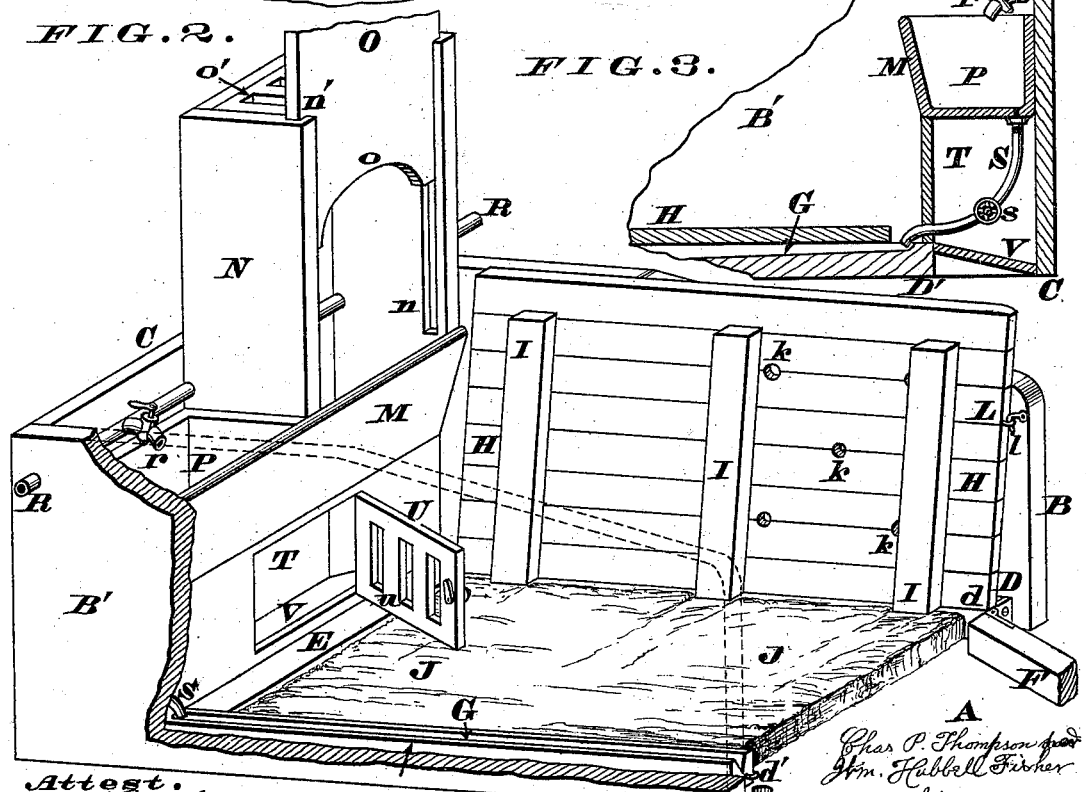

UNITED STATES PATENT OFFICE.

CHARLES P. THOMPSON, OF CINCINNATI, OHIO, ASSIGNOR OF ONE-HALF HIS RIGHT TO JOHN MAGOUN SEARS, OF SAME PLACE.

IMPROVEMENT IN STABLE-STALLS.

Specification forming part of Letters Patent No. 177,439, dated May 16, 1876; application filed February 28, 1876.

*To all whom it may concern:*

Be it known that I, CHARLES P. THOMPSON, a resident of the city of Cincinnati, in the State of Ohio, have invented certain new and useful Improvements in Stable-Stalls, of which the following is a specification:

The first part of my invention consists in constructing stalls in such a manner as to afford a dirt floor for the animal to stand on during the day-time, and a dry plank bed for him to sleep on during the night, said bed being, preferably, hinged to one side of the stall, so as to be maintained either in a horizontal or vertical position, as may be required.

The second part consists in arranging a closet under the feed-box, into which closet the straw or other bedding is deposited after it has been gathered up from off the aforesaid hinged bed. This closet is provided with a door, that is perforated or otherwise adapted to allow a current of air to circulate through the bedding, and thereby abstract any moisture or dampness from the straw.

The third part of my improvements comprises a self-ventilating hay box or trunk, located at one end of the feed-box and provided with a vertically-sliding door, which latter, when elevated, allows the hay-box to be filled with the greatest facility. The lower end of this door has an excavation or notch in it, of sufficient capacity to allow the horse or other animal occupying the stall to obtain only a limited quantity of hay at a time, by which arrangement there is no opportunity afforded for the animal to draw out more hay than is needed, and thereby waste and trample it under his feet.

The fourth part of my invention consists in locating a water-tight tank at one end of the feed-box, which tank or trough is capable of being supplied with water by means of a cock or faucet that communicates with a pipe extending along directly above all the feed-boxes in the stable. This arrangement greatly facilitates the laborious operation of watering the animals, and it also permits the hostler to wet the feed whenever required. Each tank or trough is provided with a waste-pipe, concealed within the closet beneath the feed-box, said pipe being furnished with a cock or valve, which, when opened, allows the contents of the tank to escape into a gutter formed in one of the sills of the stall. This gutter conducts the waste water into a drain, and thereby prevents the stall becoming damp and unhealthy.

The fifth part of my improvements consists in providing the plank bed with a series of grooves and perforations which collect the horse's urine and conduct it into the earth filling beneath said plank bed.

In the accompanying drawing, forming part of this specification, Figure 1 is a perspective view of my improved stable-stall in condition for night service, all of the doors of said stall being shown closed. Fig. 2 is a perspective view of the stall in condition for use in the day-time, the various doors being shown in their open position; and Fig. 3 is a vertical section through the water-tank in the plane of its waste-pipe.

A represents a portion of the floor of a stable, which floor may be composed either of plank, or bricks, or stones, or any other suitable materials; or, if preferred, the floor may consist of the bare earth. Erected upon this floor are three vertical partitions, B B' C, of which B B' compose the sides of the stall, while the partition C constitutes the end or head of the stall. The space thus inclosed by these partitions may be of any suitable size, so as to accommodate either horses or cows, &c. Secured to the floor A, and in close contact within the inner sides of partitions B B', are two longitudinal sills, D D', whose inner ends are united to a transverse sill, E. F represents a similar transverse sill, applied to the outer ends of said sills D D', and hinged to the sill D at *d*. The free end of sill F is furnished with a hook, *f*, that engages with a staple, *d'*, on the end of sill D'.

By this arrangement the sill F can be locked in a position parallel to the one E, as seen in Fig. 1, or it may be opened or swung aside, as represented in Fig. 2.

Running longitudinally of sill D' is a gutter, C, whose outer or delivery end is in close proximity to an opening, *a*, in the floor, which opening may communicate with a subterranean drain or conduit extending the entire length of the stable, and communicating with all the stalls in the same. Hinged at H h' to the sill D is a bed of stout planks, that are securely united to each other by a number of battens, I, and, if preferred, the entire under side of said bed may be furnished with similar battens, although but three are shown in the drawings. The space thus inclosed between the floor A and bed H and sills D D' E F is filled with loose earth J, upon which the animal stands during the day-time, whereupon the bed H is brought to the horizontal position seen in Fig. 1. The upper surface of the bed H is provided near its rear end with a number of grooves or scores, K, and perforations k, for a purpose which will presently appear. The rear edge of the bed is furnished with a staple, L, wherewith is engaged a hook, l, when said bed is elevated or turned on its hinges h h'. The hook l is attached to the side B of the stall. M represents the inclined front of the feed-box, which box has fitted within it the lower end of a rectangular trunk, N, that constitutes the hay-box of the stall, the said trunk being secured detachably in its position. This trunk is grooved at n n' to receive a vertically-sliding door, O, whose lower end is notched or coved at o so as to allow the animal occupying the stall to obtain access to the lower stratum of hay or other feed in said trunk. This notch O, in conjunction with a suitable opening, O', in the upper end of the trunk, allows air to circulate through the hay contained in receptacle N. The left end of feed-box M is furnished with a tank or trough, P, capable of being filled with water from a faucet, r, attached to a pipe, R, that communicates with all the stalls in the stable. The receiving end of this pipe may be attached to a street-main or other convenient source of water-supply. The tank is fitted with a waste-pipe, S, that discharges into gutter G, as more clearly shown in Fig. 3, the bed H covering the gutter during the day and preventing it filling up with dust and refuse. s is a concealed cock or faucet of the waste-pipe. Located beneath the feed-box and tank is a receptacle or closet, T, to which access is had by means of a hinged door, U, which latter is slotted or perforated at u, so as to admit air to the interior of said closet. V is the floor of said closet.

When the stall is first fitted up, the space between the sills D D' E F is filled in with loose earth J, about as high as the top of said sills, the sill F having been previously locked by hook f and staple d'. The closet T is filled with straw or other bedding for the animal, and the door U closed. The slide O is elevated, the trunk N filled with loose hay, and the slide is then depressed. The bed H is maintained in contact with partition B by engaging the hook l with staple L. This is the condition of the stall during day-time, and it will be seen that the animal, instead of being compelled to stand upon hard, unyielding, and dry stones or planks, is supported by the filling J of soft yielding earth.

This filling not only enables the animal to paw and stamp without injuring himself or annoying every person in the vicinity of the stable, but the moisture of the loose earth prevents his hoofs cracking, and therefore he is less liable to various diseases of the feet. While thus secured in the stall, he can draw out from the feed-box M as much hay as he can consume, but no more, as the slide O prevents him reaching up and pulling down the hay contained in the upper part of receptacle N. The trough P is also convenient for him to drink at without slopping the water over the stall.

As soon as evening shades prevail, the horse is taken out of the stall for a few minutes, and the bed H turned down so as to completely cover the earth filling J. The door U is then opened, and the straw or other bedding is removed from the closet T and scattered over the planks H, after which said door is closed and the horse is again led into the stall.

The horse now has an opportunity of sleeping upon dry straw and out of contact with the damp earth, and in case he should incontinently pass any water during the night, it will flow through the channels K k, and be absorbed by the earth J, which will, to a great extent, deodorize the urine, and thereby render the atmosphere of the stable much more wholesome.

In the morning the dry bedding is again deposited in closet T, the bed H turned up, and the animal allowed to stand upon the earth J.

When this earth filling has become too damp or foul, the end sill F can be disengaged from the one D', and swung aside so as to facilitate the removal of the earth, after which the sill F, being locked by the hook f and staple d', the space between the sills D D' E F is replenished with fresh, clean earth. The faucet r, being located directly over the tank P, enables the latter to be filled in the most expeditious manner, and it can be as readily emptied by properly manipulating the cocks s, which, being housed within closet T, cannot be accidentally struck by the horse.

Instead of the slots or apertures in door U and trunk N, for admitting air, openings may be made and be covered with wire screens, or else with perforated metal plates.

It will be seen that the stall, constructed as described, is capable of being readily removed, so as to constitute a portable stall for use in temporary positions.

What I claim as new, and desire to secure by Letters Patent, is—

1. A stable stall provided with a movable bed, H, and having a receptacle below the latter for an earthen filling, J, as set forth.

2. The sliding door O combined with the trunk N, arranged above the feed-box, as set forth.

3. A stable-stall provided with a water-tank and with an inlet-pipe, R, and outlet s, as set forth.

4. The tank P fitted in the feed-box M, and having an inlet, R r, and an exit, S, whose faucet or cock, s, is housed within the closet T, in the manner described, and for the purpose stated.

5. The grooves K and apertures k in the hinged bed H h h' of a stable-stall, for the object designated.

6. The combination of the sill D', having a gutter, G, leading from the waste-pipe, and the movable bed H, arranged to cover and protect the sill when depressed, substantially as set forth.

7. The combination of the movable bed H, arranged to leave a space beneath the same, and the movable sill F for closing the said space at the end, as specified.

8. The described combination of stall A B B', sills D D' E F, and hinged perforated bed H h h' K, substantially as herein described and illustrated.

C. P. THOMPSON.

Attest:
D. P. KENNDY,
W. TINSEL REES.